(12) United States Patent
Iadanola (10) Patent No.: US 9,174,671 B2
(45) Date of Patent: Nov. 3, 2015

(54) STEERING SYSTEM ARRANGEMENT WITH RELEASABLE CONNECTION MEANS

(75) Inventor: Mario Iadanola, Glynde (AU)

(73) Assignee: SCALID PTY LTD, Underdale (AU)

( * ) Notice: Subject to any disclaimer, the term of this patent is extended or adjusted under 35 U.S.C. 154(b) by 0 days.

(21) Appl. No.: 14/130,373

(22) PCT Filed: Jul. 2, 2012

(86) PCT No.: PCT/AU2012/000796
§ 371 (c)(1),
(2), (4) Date: Dec. 31, 2013

(87) PCT Pub. No.: WO2013/003896
PCT Pub. Date: Jan. 10, 2013

(65) Prior Publication Data
US 2014/0138178 A1    May 22, 2014

(30) Foreign Application Priority Data

Jul. 1, 2011  (AU) ................................ 2011902628

(51) Int. Cl.
| B62D 5/22 | (2006.01) |
| B62D 5/06 | (2006.01) |
| B23P 6/00 | (2006.01) |
| B62D 5/12 | (2006.01) |

(52) U.S. Cl.
CPC ... B62D 5/22 (2013.01); B23P 6/00 (2013.01); B62D 5/06 (2013.01); B62D 5/12 (2013.01); *Y10T 29/49721* (2015.01)

(58) Field of Classification Search
CPC ............... B62D 5/22; B62D 5/12; B62D 5/06

USPC ..................................... 280/93.513, 514, 515
See application file for complete search history.

(56) References Cited

U.S. PATENT DOCUMENTS

| 3,298,708 | A | * | 1/1967 | Cadiou ..................... 280/93.515 |
| 3,605,933 | A | * | 9/1971 | Millard ........................... 180/428 |
| 3,951,045 | A | * | 4/1976 | Frei et al. ......................... 91/467 |
| 4,146,244 | A | * | 3/1979 | Presley ........................... 180/428 |
| 4,479,400 | A | * | 10/1984 | Rieger ............................. 74/422 |
| 4,522,419 | A | * | 6/1985 | Yoshida et al. .......... 280/93.515 |
| 4,819,499 | A | * | 4/1989 | Morell ............................. 74/498 |
| 4,887,683 | A | * | 12/1989 | Klosterhaus et al. .......... 180/428 |
| 5,975,573 | A | * | 11/1999 | Belleau .......................... 280/771 |
| 6,039,334 | A | * | 3/2000 | Ozeki ....................... 280/93.514 |
| 6,070,891 | A | * | 6/2000 | Knautz et al. ............ 280/93.514 |
| 6,273,210 | B1 | * | 8/2001 | Saito et al. ..................... 180/444 |
| 6,457,375 | B1 | * | 10/2002 | Buch .......................... 74/388 PS |
| 6,588,535 | B1 | * | 7/2003 | Jones ............................. 180/312 |
| 8,201,656 | B2 | * | 6/2012 | Archer et al. ................. 180/428 |
| 8,387,742 | B2 | * | 3/2013 | Fujimoto ....................... 180/427 |
| 2002/0020981 | A1 | * | 2/2002 | Kojima ..................... 280/93.514 |
| 2003/0107200 | A1 | * | 6/2003 | Huang et al. ............. 280/93.515 |

FOREIGN PATENT DOCUMENTS

DE     202006015525 U1    11/2006

* cited by examiner

*Primary Examiner* — Joseph Rocca
*Assistant Examiner* — Gabriela C Craciun (57) ABSTRACT

This invention relates to a steering system arrangement for a vehicle, the steering system arrangement comprising a first portion providing a steering input, and a second portion providing a steering output, the first and second portions being connected by connection means selectively releasable to permit selection of the relative positioning of the steering input and the steering output. An associated method for retro fitting the steering system arrangement to a vehicle is also disclosed.

13 Claims, 10 Drawing Sheets

Fig 1

LHD
Fig 2

RHD
Fig 3

STEERING SYSTEM ARRANGEMENT WITH RELEASABLE CONNECTION MEANS

FIELD OF THE INVENTION

The present invention relates to a steering system arrangement.

BACKGROUND OF THE INVENTION

Drivers of early model vehicles that have their original steering configuration, often experience vagueness in steering while driving. This is a result of worn component such as the original steering box and steering linkages.

Vehicles from the 1960's and 70's, often referred to as muscle cars, typically have recirculating ball steering arrangements which are known to have a "dead spot" on centre. This dead spot means that a small turn of the steering wheel does not influence the vehicle's direction of travel.

Furthermore the steering of older vehicles often display mechanical play, slow response and poor centring capabilities.

These vehicles typically did not include power assisted steering systems. This, combined with their weight results in a significant amount of effort being required to turn the steering wheel, especially at low speed.

Simply rebuilding the existing steering systems of these vehicles using new gears, bearings and linkages may reduce the mechanical play. The feel of the steering does not however compare to the performance of modern power assisted rack and pinion steering systems. As a result many owners opt to replace the original mechanical steering systems with rack and pinion powered assisted steering, which utilize a hydraulic pump to increase the ease of steering at low speed.

Conventional rack and pinion steering systems include a rack, having teeth along one side, adapted to engage a toothed end of a pinion shaft. The opposite end of the pinion shaft is connected to the steering wheel shaft by way of a universal joint.

The rack is connected to opposing front wheels by way of corresponding tie rods. This means that the circular motion of the steering wheel and pinion shafts is converted into rectilinear movement of the rack and tie rod ends. There are many advantages with modern rack and pinion steering systems, including that they eliminate the on-centre spot and offer improved steering accuracy, reduced effort, and considerably improved tracking ability.

A popular type of rack and pinion steering system is the centre takeoff systems, which enable correct geometry and an optimum level of positive and direct steering. Centre takeoff systems include a pinion and a rack having a toothed portion and a shaft portion, wherein the rack is connected to a drag link that in turn is connected to the tie rod ends. This construction is more compact than the "enddriven" design rack and pinion systems, where the tie rods connect directly to opposing ends of the rack.

Due to their many advantages, power assisted rack and pinion conversions have become a popular option for owners of cars such as the Pontiac GTO, Ford Mustang and Chevrolet Corvette. This is especially the case when cars are being converted between left and right hand drive because the owner is already required to replace or modify the steering system.

One of the problems with existing centre takeoff rack and pinion assemblies, is they typically need to be custom made for each make and model of vehicle. This is because the pinion needs to be at a different angle for different types of vehicle to take into account the particular constraints of the Y-frame, the configuration of the engine bay and placement of components therein.

Furthermore the centre takeoff rack and pinion system has to allow placement of the steering rack to provide adequate clearance for both long and short tube exhaust manifolds, or aftermarket components within the engine bay. There may also be physical constraints arising from converting a vehicle between left and right hand drive.

An object of the present invention is to ameliorate one or more of the above described difficulties, or at least provide a useful alternative to steering arrangements of the type discussed above.

Other advantages of the present invention will become apparent from the following description, taken in connection with the accompanying drawings, wherein, by way of illustration and example, several embodiments of the present invention are disclosed.

SUMMARY OF THE INVENTION

In one aspect of this invention, there is proposed a steering system arrangement for a vehicle, the steering system arrangement comprising a first portion providing a steering input, and a second portion providing a steering output, the first and second portions being connected by connection means selectively releasable to permit selection of the relative positioning of the steering input and the steering output.

When not released (i.e. secured), the selectively releasable connection means secure the first and second portions in the selected orientation relative to one another.

In one form, the connection means are selectively releasable to permit the rotation of one or both of these portions with respect to the other so that the position of the steering input relative to the steering output can be adjusted by this rotation.

In one form, the steering input is a rotary one.

In one form, the steering output is a linear one.

In one form, the steering system arrangement further comprises a third portion housing means for reducing the steering input required to effect a given steering output (ie. steering assistance means).

In one form, the third portion comprises at least one connection point for connecting steering assistance control means thereto.

In one form, said third portion is connected to one of the first or second portions by connection means selectively releasable to permit selection of the relative positioning of the or each connection point relative to the remainder of the steering system arrangement.

In one form, the first portion of the steering system arrangement comprises a pinion housing, a pinion shaft having a first end for connection with a steering wheel shaft and a second toothed end engaged with a corresponding toothed portion of an elongate rack partially housed by the pinion housing.

In one form, the second portion of the steering system arrangement comprises a centre housing surrounding at least a portion of the elongate rack, a centre steer block extending through a longitudinally extending slot in a sidewall of the centre housing and slidable therealong by a steering input caused by rotation of the pinion in the first portion.

In one form, the pinion housing and centre housing are coaxially aligned and connected by the connection means.

In one form, the third portion of the steering system arrangement comprises a piston housing for a piston assembly, wherein the piston housing and centre housing are coaxially aligned and connected by the connection means selectively releasable to permit rotation of one or both of these with respect to the other.

When not released, the selectively releasable connection means secure the piston housing and centre housing in the selected orientation relative to one another.

In one form, the piston assembly comprises a piston rod connected to and coaxially aligned with the elongate rack, and a piston carried by the piston rod and located in a bore within the piston housing.

In one form, the centre steer block is carried by the rack, but can rotate relative to the rack.

In one form, the rack extends through a passageway passing through the centre steer block.

In one form, the centre steer block is located by and captured between a shoulder formed into the rack and a nut secured to the end of the rack.

In one form, the piston housing and piston assembly form a double-acting hydraulic cylinder.

In one form, the double-acting hydraulic cylinder is controlled by the steering assistance control means.

In one form, steering assistance control means is incorporated into a collar associated with the pinion housing and which is rotatable around the pinion shaft.

In one form, the steering assistance control means is operatively connected to the steering assistance means (ie. the double-acting hydraulic cylinder) to effect control of this in response to steering inputs provided to the pinion shaft.

In a further aspect of this invention, there is proposed a steering system arrangement for a vehicle comprising a first portion providing a steering input, a second portion providing a steering output, and a third portion providing means for reducing the steering input required to effect a given steering output, the first and third portions being connected to the second portion by connection means selectively releasable to permit rotation of each portion relative to the others.

In a further aspect of this invention, there is proposed a steering system arrangement for a vehicle, the steering system arrangement comprising a pinion shaft having a first end for connection with a steering wheel shaft and a second toothed end engaged with a corresponding toothed portion of an elongate rack, a pinion housing and a centre housing, each surrounding at least a portion of the rack, a centre steer block extending through a longitudinally extending slot in a sidewall of the centre housing and slidable therealong by a steering action caused by rotation of the pinion, the pinion housing and centre housing being coaxially aligned and connected by connection means selectively releasable to permit rotation of one or both of these with respect to the other.

In a further aspect of this invention, there is proposed a method of retro fitting the above described steering arrangement to a vehicle, the method comprising the steps of positioning the arrangement in position in the vehicle, releasing the connection means and rotating one or both of the first and second portions until the steering input and output are positioned for connection to the vehicle, securing the connection means, and then connecting the steering input and output to the vehicle.

In one form, the method further comprises the step of releasing the connection means for the third portion and rotating the third portion until the or each connection point for the steering assistance means is positioned for connection to the steering assistance control means, securing the connection means, and then connecting the steering assistance means to the steering assistance control means.

In one form, the method further comprises the step of rotating the collar associated with the pinion housing until the steering assistance control means is positioned for connection to the steering assistance means, and then connecting the steering assistance means to the steering assistance control means.

BRIEF DESCRIPTION OF THE DRAWINGS

For a better understanding of this disclosure it will now be described with respect to one or more exemplary embodiments, which shall be described herein with the assistance of drawings wherein.

In the following description, like reference characters designate like or corresponding parts throughout the several views of the drawings.

DESCRIPTION OF A PREFERRED EMBODIMENT

Figure 1:
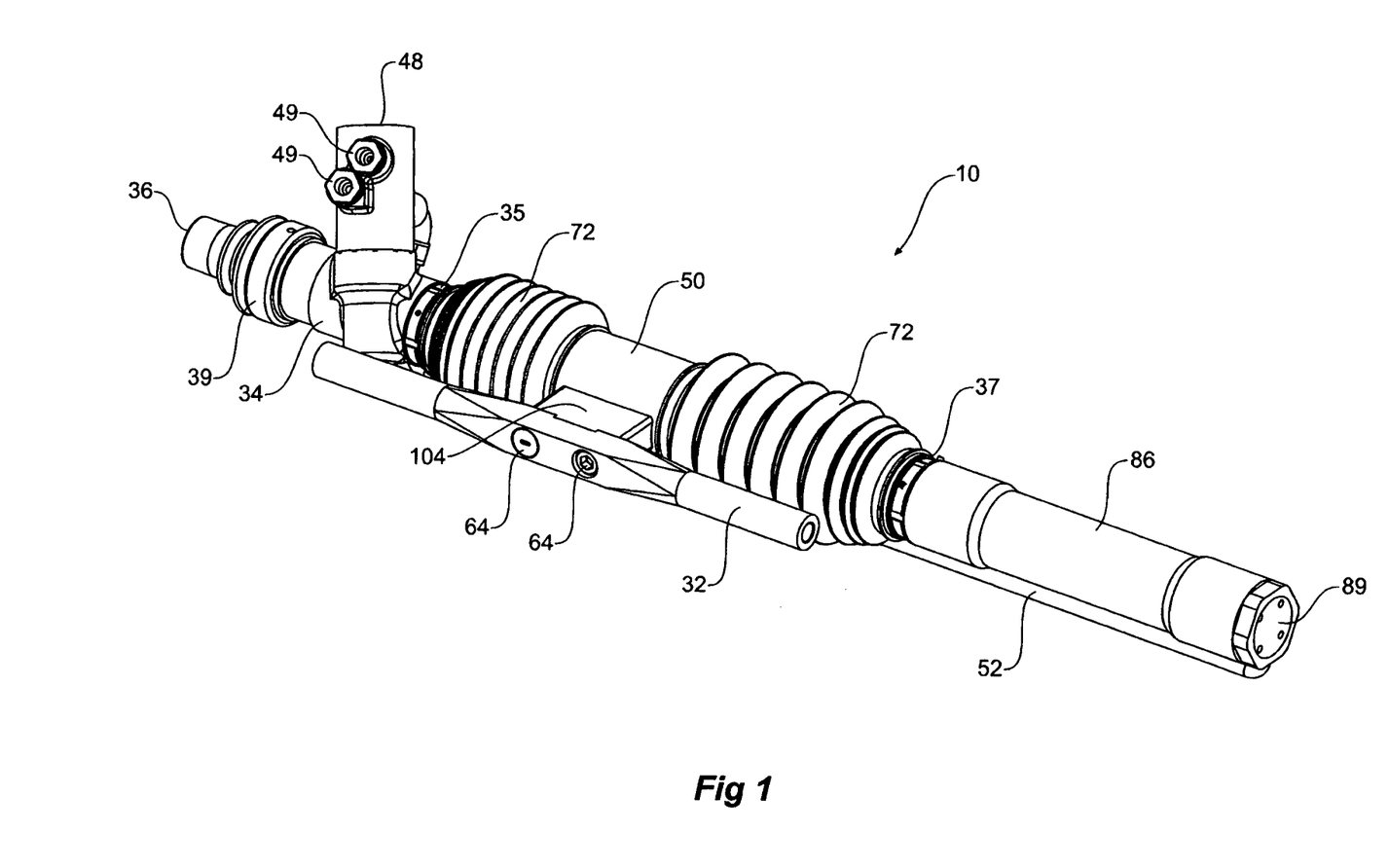
FIG. 1 is a perspective view of a steering system arrangement.
Figure 2:
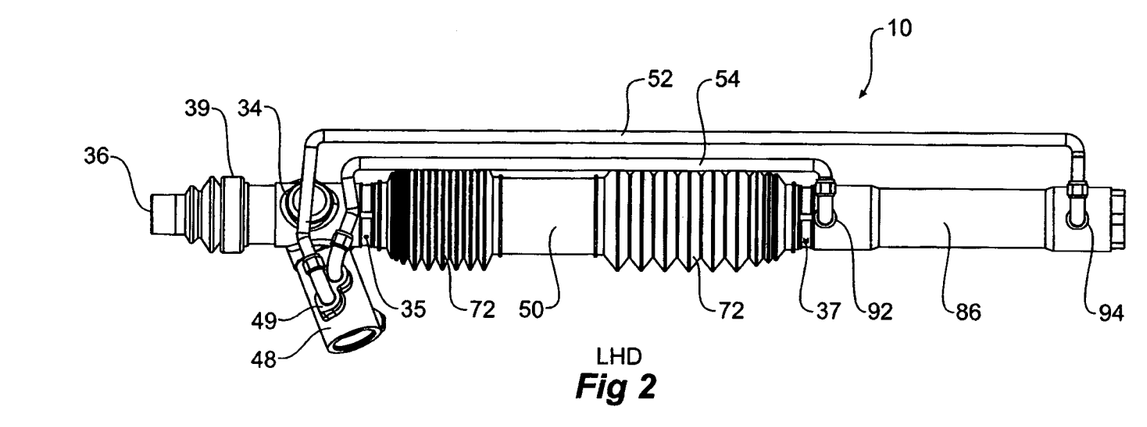
FIG. 2 is a plan view of the steering system arrangement configured for a left hand drive vehicle.
Figure 3:
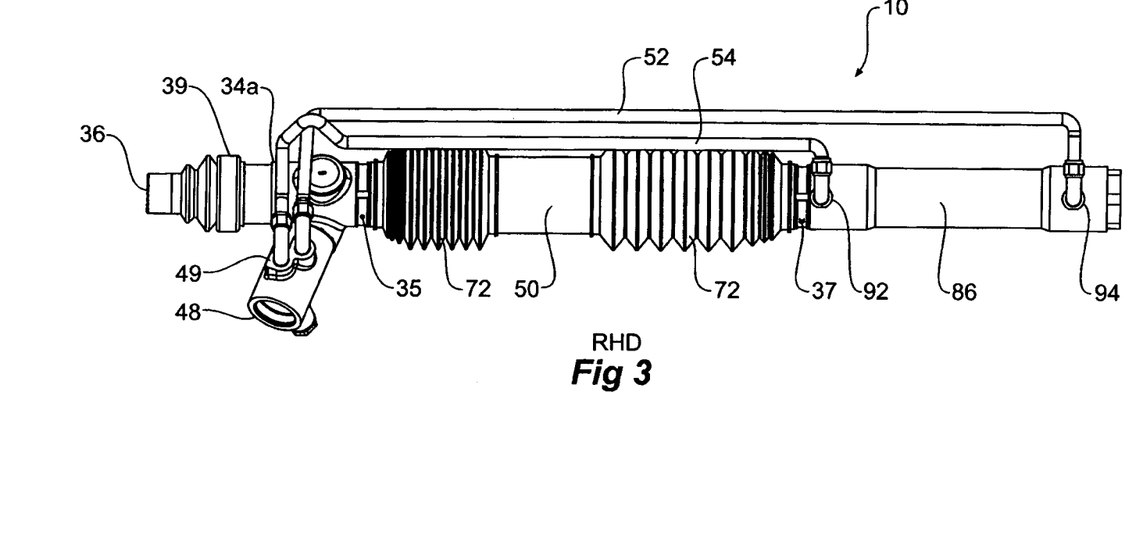
FIG. 3 is a plan view of the steering system arrangement configured for a right hand drive vehicle.
Figure 4:
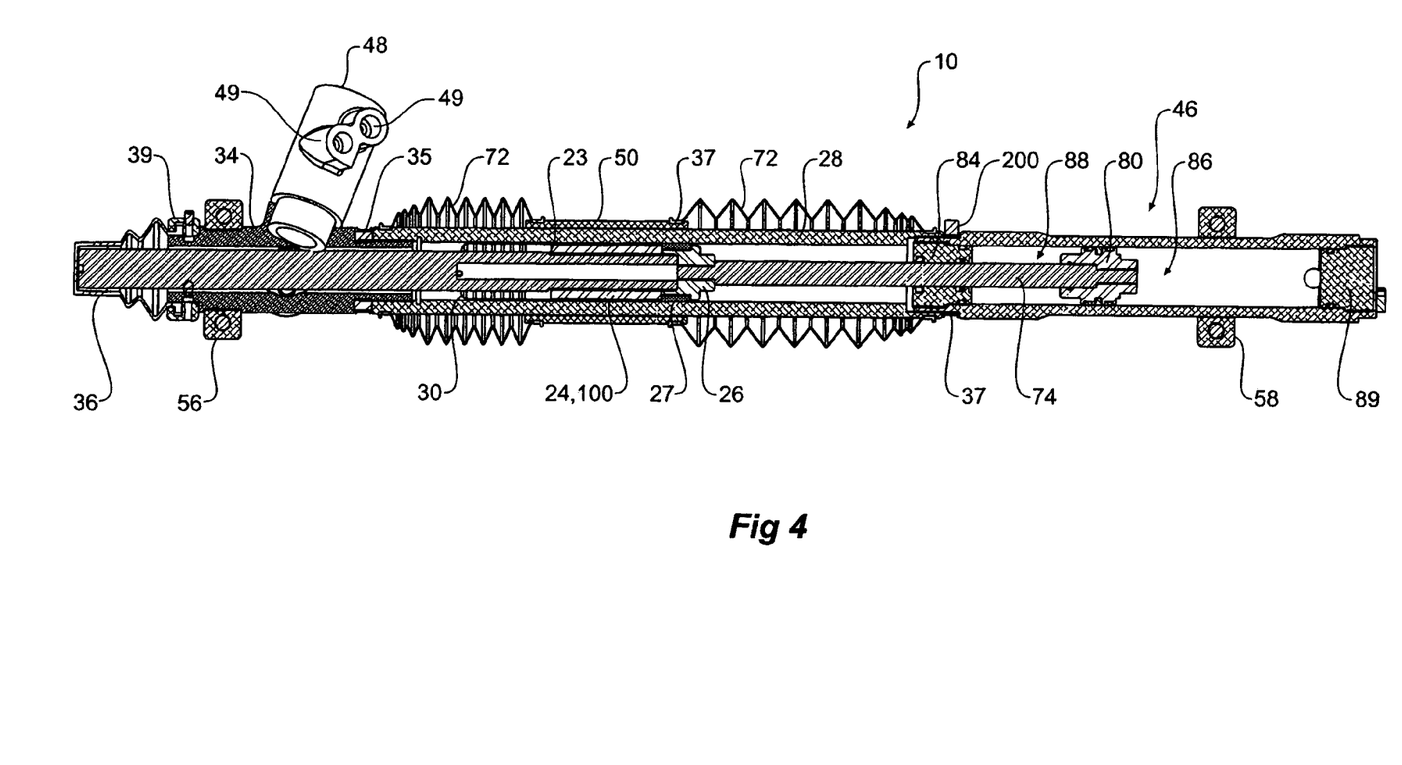
FIG. 4 is a cross-sectional view taken lengthwise through the steering system arrangement.
Figure 5:
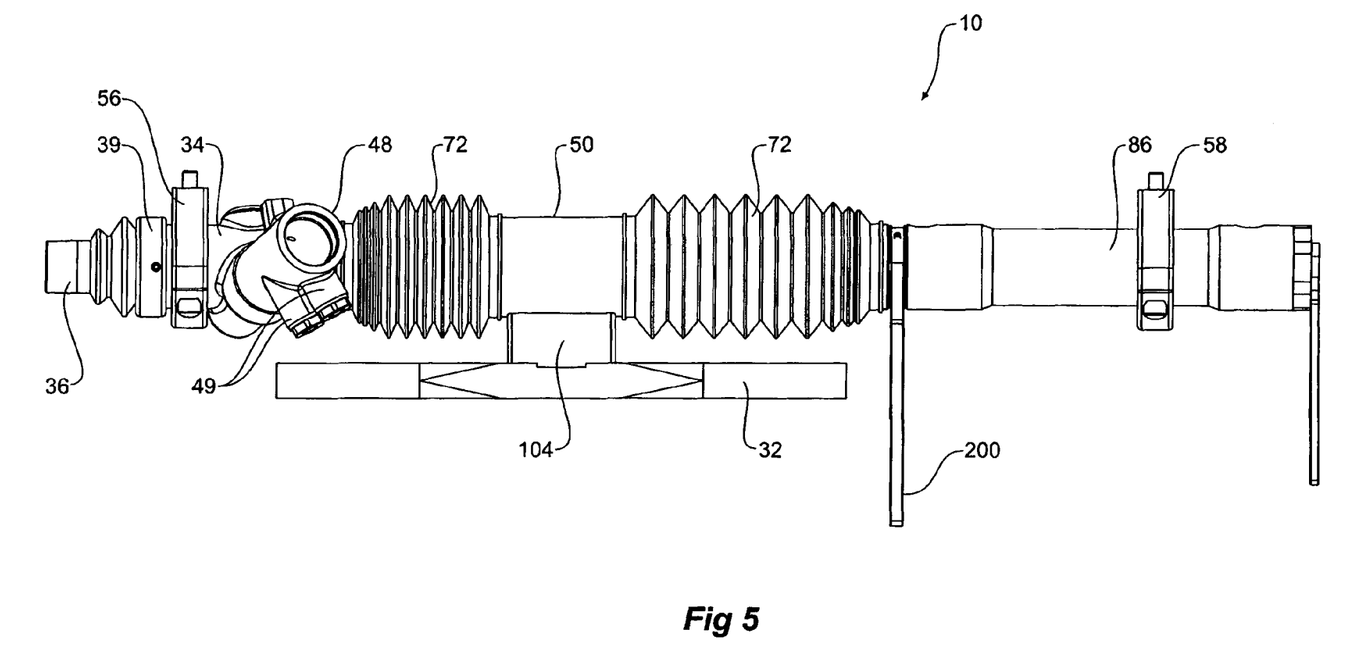
FIG. 5 is a side view of the steering system arrangement.
Figure 9:
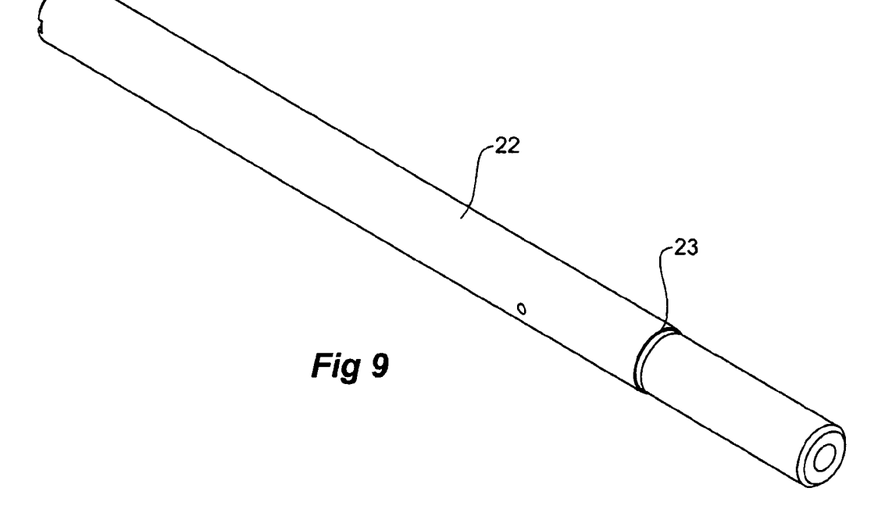

Referring now to FIGS. 1 through 5, and particularly FIG. 4, where there is illustrated a steering system arrangement 10 for a vehicle, comprising a pinion shaft (not shown) having a first end for connection with a steering wheel shaft by way of a universal joint (similarly not shown) and a second toothed end for engagement with a corresponding toothed portion 20 of an elongate rack 22 (see FIG. 9).

Figure 23:
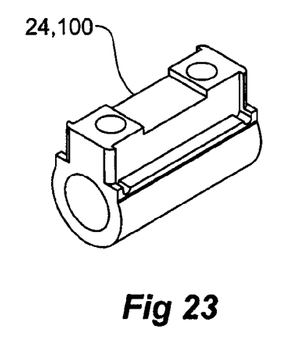

There is a centre steer block 24 carried on the elongate rack 22 and a centre housing 28 surrounding at least a portion of said elongate rack 22, said centre housing 28 including a longitudinally extending slot 30 (see FIG. 22) in a sidewall thereof, through which the centre steer block 24 outwardly extends. The centre steer block 24 comprises a body 100 (see FIG. 23 also) shaped to fit with a sliding fit within the centre housing 28.

To one end of the centre housing 28 there is rotatably connected a pinion housing 34 (see FIG. 7 also) that is configured to accommodate the toothed end of the pinion shaft and the toothed portion 20 of the rack 22. The rack 22 extends from the pinion housing 34 into the tubular centre housing 28.

Figure 13:
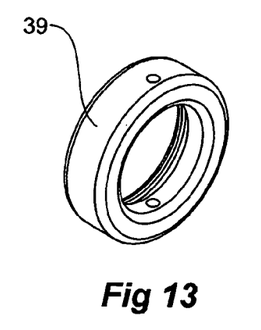
Figure 14:
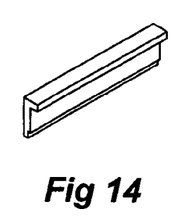

A bellows 36 is secured to an annular shoulder 38 on the pinion housing 34 by a bellows retaining ring 39 (see FIG. 13 also). The toothed portion 20 of the rack 22 extends into bellows 36 when the steering is at full lock.

Figure 8:
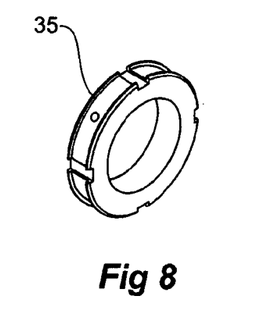
Figures 17, 19:
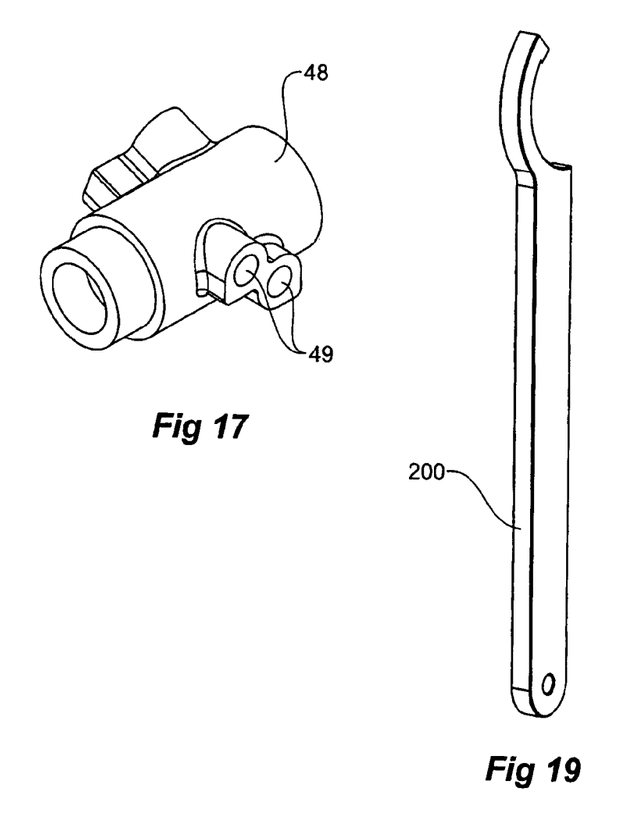

The pinion housing 34 is held in place against the centre housing 28 by connection means selectively releasable to permit rotation, such as an annular lock ring or clamp 35 (see FIG. 8 also), which may be released and secured using a lock ring spanner 200 (see FIG. 19 also).

Figures 21, 22:
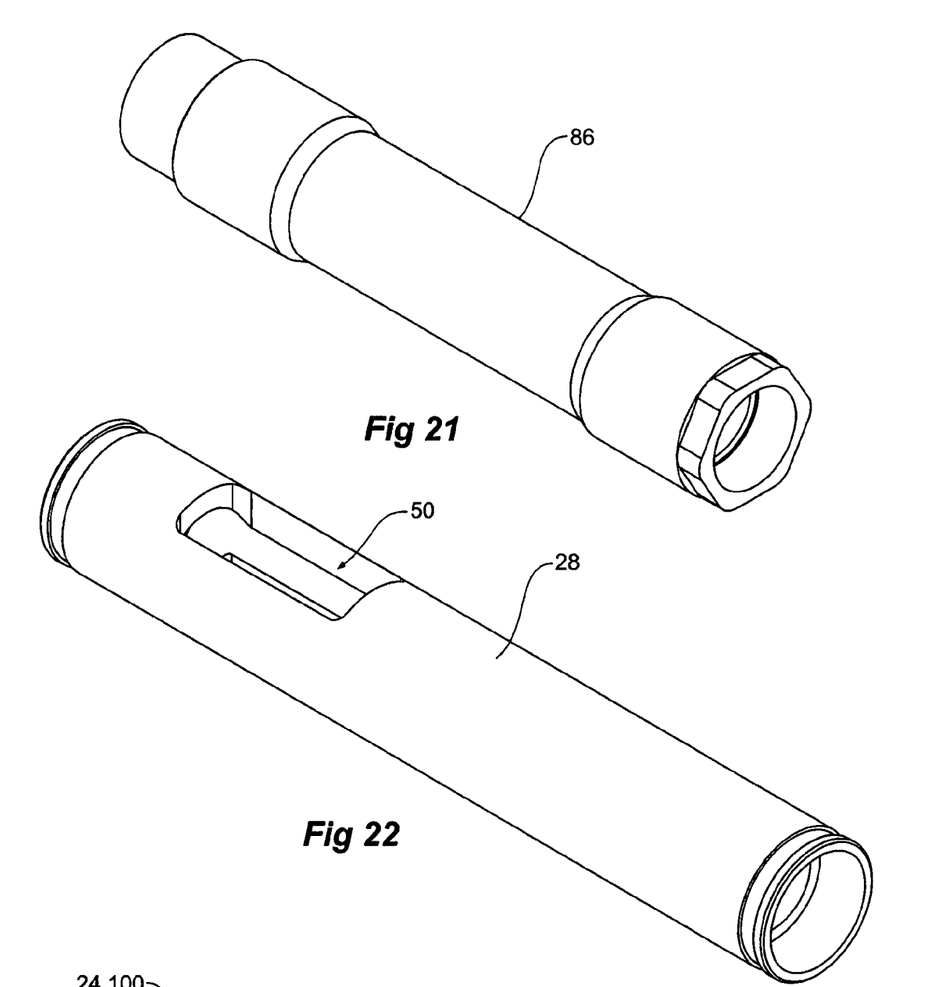
Figure 25:
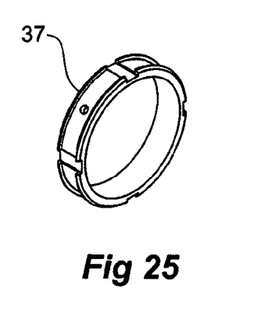
Figure 26:
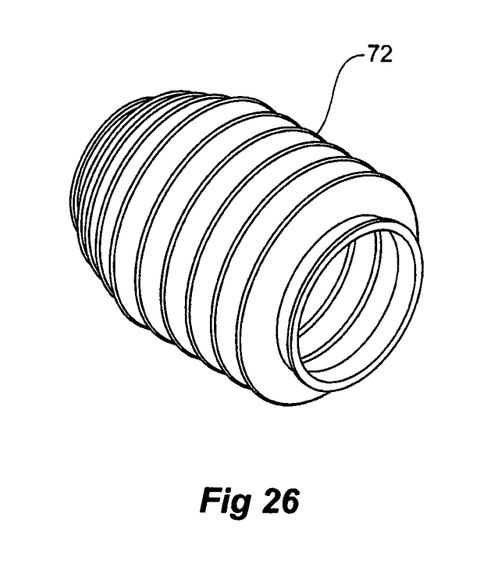
Figure 27:
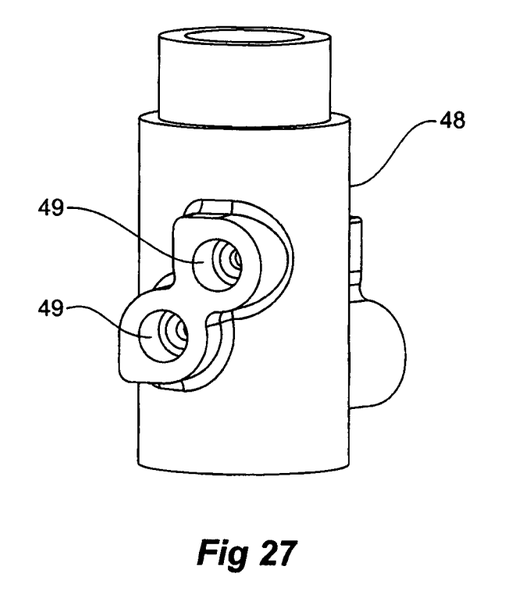
Figure 28:
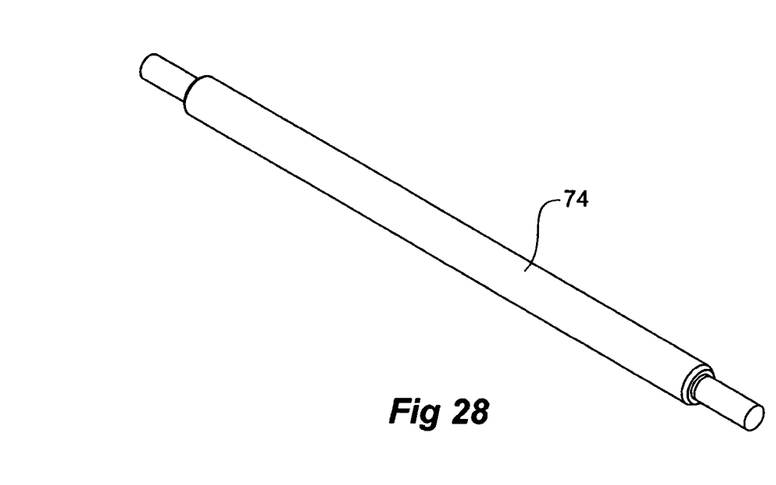
Figure 29:
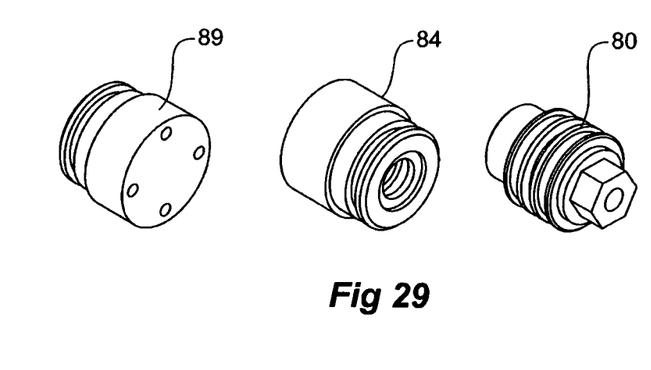

To the distal end of the centre housing 28 there is rotatably connected a piston housing 86 (see FIG. 21 also). Similar to the pinion housing 34, the piston housing 86 is held in place against the centre housing 28 by connection means selectively releasable to permit rotation, such as another annular lock ring or clamp 37 (see FIG. 25 also).

Figure 24:
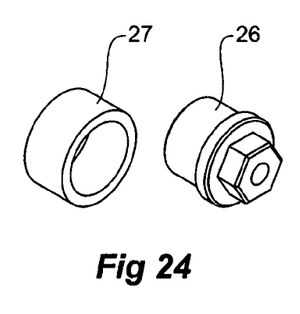

This body 100 is securely located between a shoulder 23 in the rack 22 and a guide nut member 26 (see FIG. 24 also) and can rotate relative to the rack 22. A guide bush 27 (see FIG. 24 also) is disposed over the guide nut member 26 and serves to guide the guide nut member 26 along the bore in the centre housing 28, thereby providing sliding guidance to the rack 22 and piston rod 74.

Figure 16:
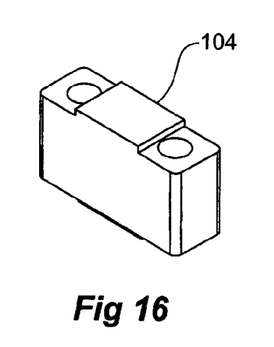

A drag link connection block 104 (see FIG. 16 also) is securely located between a pair of shoulders on the body 100 and extends out through the slot 30 in the centre housing 28.

Figure 15:
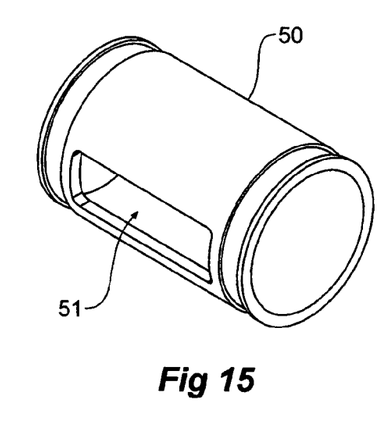

An external slide collar 50 (see FIG. 15 also) slides over the centre housing 28 and comprises a slot 51 through which the drag link connection block 104 extends.

There is a dust boot 72 fixed to the external slide collar 50 so as to extend from opposing ends of the drag link connection block 104 to the opposing ends of the centre housing 28 and prevent the ingress of dirt though the slot 30 in the centre housing 28.

Figure 18:
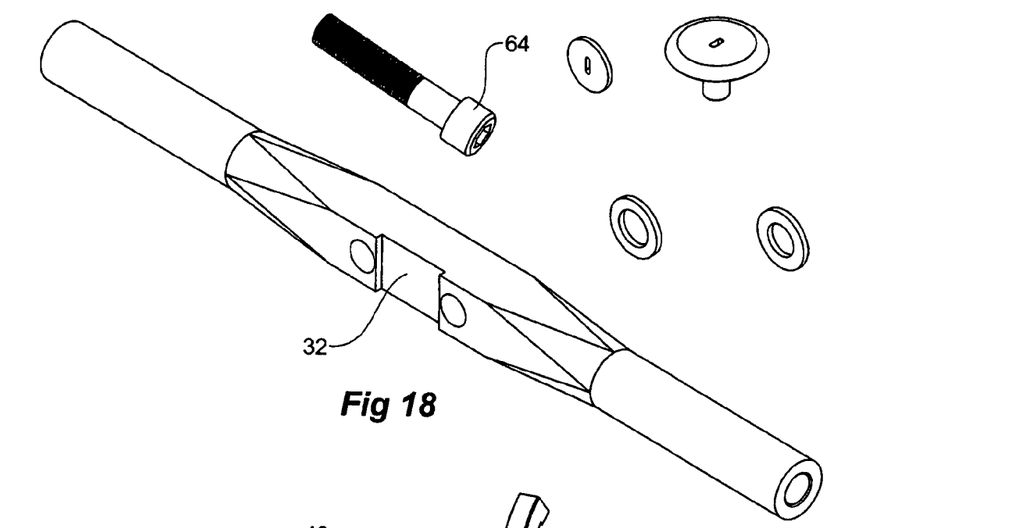
Figure 20:
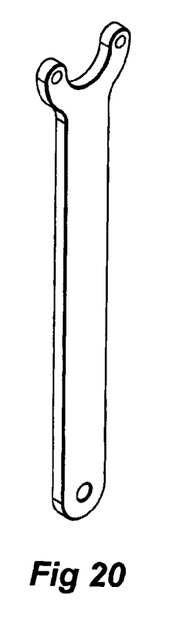

A drag link 32 (see FIG. 18 also) is attached to the centre steer block 24 by way of bolts 64 that pass through apertures in the drag link 32 and drag link connection block 104 and engage with threaded holes in the centre steer block 24. In this way the centre steer block 24 maintains the drag link 32 and rack 22 in a parallel, spaced relationship. The drag link 32 is connected to two tie ends (not shown) that in turn are connected to the front wheels of the vehicle as known in the art.

Teeth of the pinion shaft (not shown) and rack 22 respectively are configured to engage with each other to convert the circular motion of the steering wheel shaft into rectilinear motion of the rack 22, centre steer block 24, drag link connection block 104, drag link 32 and tie ends, which effect the turning of front wheels of the vehicle in turn.

The steering system arrangement 10 includes a hydraulic piston assembly 46 that is connected to the rack 22 to provide power assistance.

Figure 30:
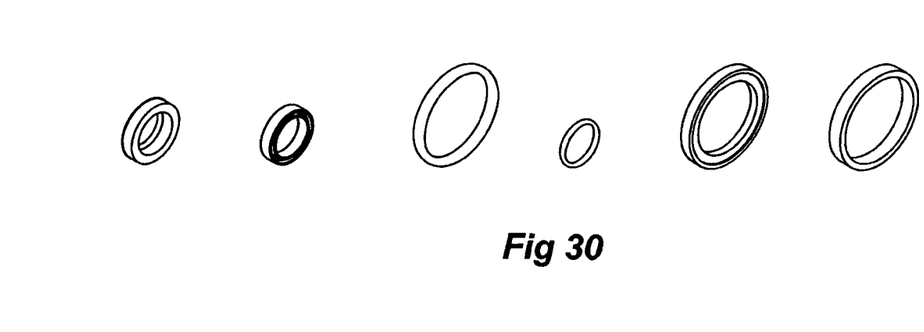

The elongate rack 22 and a piston rod 74 are coaxially connected and aligned by a guide nut member 26. The distal end 78 of the piston rod 74 extends through a seal 84 into a piston housing 86 and carries a piston 80. Additional seals (illustrated in FIG. 30) seal and guide the hydraulic piston assembly 46.

The piston housing 86, seal 84 and piston 80 define a first chamber 88, and the piston 80 and an end cap 89 in a blind end of the piston housing 86 define a second chamber 90. The two chambers 88, 90 are connected via supply ports 92, 94 (see FIGS. 2 and 3) and pipes 52, 54 to a hydraulic device, namely a hydraulic control valve, incorporated into a housing 48 which doubles as a collar for the pinion shaft. Accordingly, housing 48 is associated with the pinion housing 34, it comprises valve housing ports 49 to which pipes 52, 54 connect, and is rotatable around the pinion shaft.

Rotation of the steering wheel causes the hydraulic control valve in housing 48 to control the distribution of hydraulic fluid to one of chambers 88 or 90 to assist in the rectilinear driving of the rack 22 and the turning of the front wheels in turn.

Figure 11:
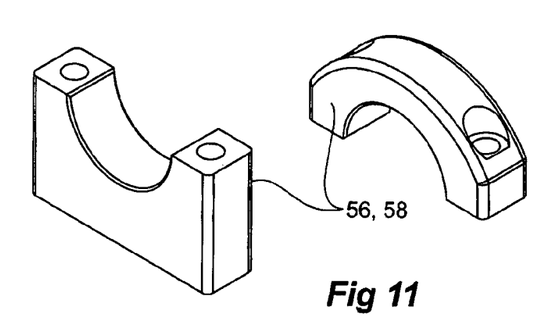
Figure 12:
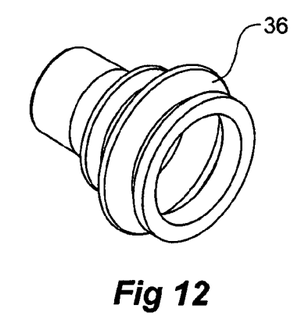

The arrangement 10 is secured to a vehicle chassis or body by way of mounting blocks 56, 58 (FIG. 11 also).

The arrangement 10 according to the present invention offers a number of significant advantages in as much as it incorporates such a significant degree of adjustability as to be adaptable to almost any make and model of vehicle, regardless of the positioning and geometry of its steering components. Furthermore, by scaling the arrangement 10 up as required, it may be adapted to fit larger commercial vehicles.

Figure 6:
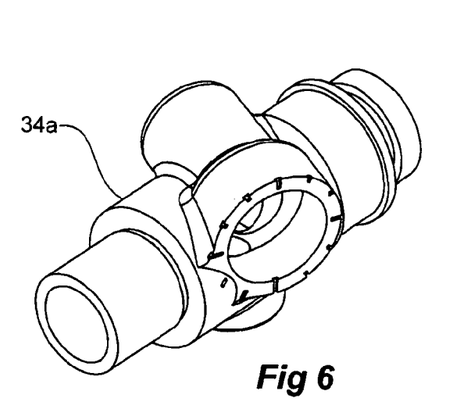
FIGS. 6 through 30 are detail views of component parts of the steering system arrangement.
Figure 7:
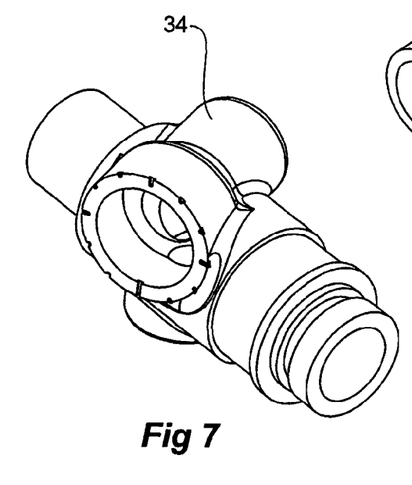

Firstly, the arrangement can be configured for either of a left (see FIG. 2) or right hand (see FIG. 3) drive vehicle by fitment of one of two alternate pinion housings 34 or 34a respectively (see FIGS. 6 and 7 also).

Secondly, by rotation of the valve housing 48 around the pinion shaft 12 the positioning and orientation of the valve housing ports 49 can be selected to suit.

Thirdly, by releasing locking ring 35, the pinion housing 34, and the pinion shaft and valve housing 48 with it can be rotated relative to the remainder of the steering arrangement 10 and the orientation of the pinion shaft (which will pass through valve housing 48) selected to suit, and secured in its selected position by securing the locking ring 35.

Figure 10:
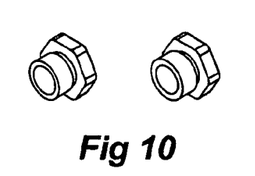

Fourthly, by releasing locking ring 37, the piston housing 86 can be rotated relative to the remainder of the steering arrangement 10 and the orientation of the supply ports 92, 94, and connectors therefor (see FIG. 10) selected to suit, and secured in its selected position by securing the locking ring 37.

Fifthly, by releasing locking rings 35 and 37, the centre housing 28 can be rotated relative to the remainder of the steering arrangement 10 and the orientation of the centre steer block 24, drag link connection block 104, and drag link 32 selected to suit, and secured in their selected position by securing the locking rings 35 and 37.

As the reader will now appreciate, the significant degree of adjustability afforded by arrangement 10 means the position and/or orientation of numerous components can be varied (as discussed above) during test fitment to the vehicle, and configured to both fit the vehicle and clear exhaust manifolds and other vehicle components positioned within the engine bay.

Moreover, the arrangement 10 has no internal or external welded components, and it is fully serviceable, so it need never be discarded because any worn components can be replaced.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that various modifications can be made without departing from the principles of the invention. Therefore, the invention should be understood to include all such modifications in its scope.

The invention claimed is:

1. A steering system arrangement for a vehicle, the steering system arrangement comprising a first portion providing a steering input, and a second portion providing a steering output, the first and second portions being connected by connection means selectively releasable to permit selection of the relative positioning of the steering input and the steering output wherein said connection means are selectively releasable to permit the rotation of one or both of these portions with respect to the other so that the position of the steering input relative to the steering output can be adjusted by this rotation.

2. The steering system of claim 1, wherein the second portion of the steering system arrangement comprises a centre housing surrounding at least a portion of an elongate rack, a centre steer block extending through a longitudinally extending slot in a sidewall of the centre housing and slidable therealong by a steering input caused by rotation of a pinion in the first portion.

3. The steering system of claim 2, wherein a pinion housing and centre housing are coaxially aligned and connected by the connection means.

4. The steering system of claim 2, wherein a third portion of the steering system arrangement comprises a piston housing for a piston assembly, wherein the piston housing and centre housing are coaxially aligned and connected by the connection means selectively releasable to permit rotation of one or both of these with respect to the other.

5. The steering system of claim 2, wherein another selectively releasable connection means secures the piston housing and centre housing in the selected orientation relative to one another.

6. The steering system of claim 4, wherein the piston assembly comprises a piston rod connected to and coaxially aligned with the elongate rack, and a piston carried by the piston rod and located in a bore within the piston housing.

7. The steering system of claim 2, wherein, the centre steer block is carried by the rack, but can rotate relative to the rack.

8. The steering system of claim 2, wherein the rack extends through a passageway passing through the centre steer block.

9. The steering system of claim 2, wherein the centre steer block is located by and captured between a shoulder formed into the rack and a nut secured to the end of the rack.

10. The steering system of claim 2, wherein the piston housing and piston assembly form a double-acting hydraulic cylinder, and wherein the double-acting hydraulic cylinder is controlled by a steering assistance control means.

11. The steering assembly of claim 10, wherein the steering assistance control means is incorporated into a collar associated with the pinion housing and which is rotatable around the pinion shaft; and wherein the steering assistance control means is operatively connected to a steering assistance means to effect control of this in response to steering inputs provided to the pinion shaft.

12. A steering system arrangement for a vehicle, the steering system arrangement comprising a pinion shaft having a first end for connection with a steering wheel shaft and a second toothed end engaged with a corresponding toothed portion of an elongate rack, a pinion housing and a centre housing, each surrounding at least a portion of the rack, a centre steer block extending through a longitudinally extending slot in a sidewall of the centre housing and slidable therealong by a steering action caused by rotation of the pinion, the pinion housing and centre housing being coaxially aligned and connected by connection means selectively releasable to permit rotation of one or both of these with respect to the other.

13. A method of retro fitting the steering system arrangement of claim 1 to a vehicle, the method comprising the steps of positioning the arrangement in position in the vehicle, releasing the connection means and rotating one or both of the first and second portions until the steering input and output are positioned for connection to the vehicle, securing the connection means, and then connecting the steering input and output to the vehicle.

\* \* \* \* \*